United States Patent [19]

McCarrick et al.

[11] Patent Number: 5,888,161
[45] Date of Patent: Mar. 30, 1999

[54] ALL WHEEL DRIVE CONTINUOUSLY VARIABLE TRANSMISSION HAVING DUAL MODE OPERATION

[75] Inventors: Daniel Warren McCarrick, Canton; Barry John Melhorn, Ann Arbor; Rudolf Beim, Bloomfield Hills, all of Mich.

[73] Assignee: Ford Global Technologies, Inc., Dearborn, Mich.

[21] Appl. No.: 44,102

[22] Filed: Mar. 19, 1998

[51] Int. Cl.⁶ ................................................. F16H 47/08
[52] U.S. Cl. ............................ 475/43; 475/207; 475/210
[58] Field of Search .................................. 475/207, 210, 475/43

[56] References Cited

U.S. PATENT DOCUMENTS

| | | | |
|---|---|---|---|
| 3,203,277 | 8/1965 | General | 74/689 |
| 4,458,559 | 7/1984 | Croswhite et al. | 74/730 |
| 4,543,852 | 10/1985 | Svab et al. | 74/695 |
| 4,608,032 | 8/1986 | Stockton et al. | 474/28 |
| 4,644,820 | 2/1987 | Macey et al. | 74/689 |
| 4,784,630 | 11/1988 | Takahashi | 474/28 |
| 4,820,242 | 4/1989 | Sato | 474/8 |
| 4,836,049 | 6/1989 | Moan | 74/689 |
| 4,838,836 | 6/1989 | Sakai et al. | 474/28 |
| 4,852,427 | 8/1989 | van der Veen | 74/689 |
| 4,854,919 | 8/1989 | van Lith | 474/25 |
| 4,856,369 | 8/1989 | Stockton | 74/665 GF |
| 4,876,920 | 10/1989 | Eichenberger | 74/689 |
| 4,919,007 | 4/1990 | Van Der Hardt Aberson et al. | 474/72 |
| 5,048,371 | 9/1991 | Hendriks | 74/730.1 |
| 5,049,112 | 9/1991 | Gunsing | 474/8 |
| 5,098,345 | 3/1992 | Van Vuuren | 474/8 |

FOREIGN PATENT DOCUMENTS 2-180-020  3/1987  United Kingdom .

OTHER PUBLICATIONS

The Ford Research Dual Mode Continuously Variable Transmission, T.R. Stockton, Oct., 1994.
"All Wheel Drive Continuously Variable Transmission Having Dual Mode Operation", Serial No. 09/044,338, Filing Date Mar. 19, 1998, Inventors Daniel McCarrick, Barry Melhorn, and Rudolf Beim.
"All Wheel Drive Continuously Variable Transmission Having Dual Mode Operation", Serial No. 09/044, 335, Filing Date Mar. 19, 1998, Inventors Daniel McCarrick, Barry Melhorn, and Rudolf Beim.
"Dual Mode Operation Continuously Variable Transmission Having Creeper Low And Reverse Gears", Serial No. 09/044,336, Filing Date Mar. 19, 1998, Inventors Daniel McCarrick, Barry Melhorn, and Rudolf Beim.
"All Wheel Drive Continuously Variable Transmission Having Dual Mode Operation", Serial No. 09/044,337, Filing Date Mar. 19, 1998, Inventors Daniel McCarrick, Barry Melhorn, and Rudolf Beim.
"All Wheel Drive Continuously Variable Transmission Having Dual Mode Operation", Serial No. 09/044,492, Filing Date Mar. 19, 1998, Inventors Daniel McCarrick, Barry Melhorn, and Rudolf Beim.

*Primary Examiner*—Rodney H. Bonck
*Assistant Examiner*—Tisha D. Waddell
*Attorney, Agent, or Firm*—Frank G. McKenzie

[57] ABSTRACT

An automatic transmission for an automotive vehicle includes a continually variable drive mechanism having one sheave assembly supported on an input shaft and the output sheave assembly fixed to an intermediate shaft, a planetary gearset driveably connected to the input shaft and a layshaft gearset, a fixed ratio drive mechanism in the form of a chain drive providing a torque delivery path between the intermediate shaft and the output shaft, a transfer clutch for connecting and releasing the first sheave of the variable drive mechanism and input shaft, a low brake, and first and second reverse clutches for connecting and releasing alternately the input shaft, output shaft and output shaft, and a clutch for selectively driveably connecting the output of the second fixed drive mechanism and a front output shaft.

12 Claims, 2 Drawing Sheets

| | Friction Element | | | | | |
|---|---|---|---|---|---|---|
| RANGE | LOW 98 | REV 100 | TRF 102 | OWC1 66 | DOG 106 | REV 2 101 |
| LOW | X | | | X | | |
| VAR | | | X | O/R | | |
| REV | | X | | | X | |
| REV ALT | | X | | | | X |
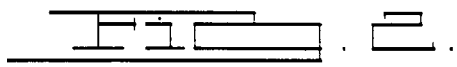
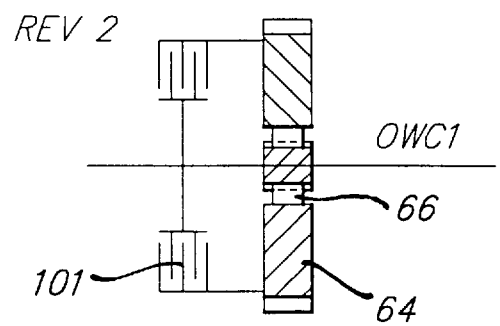

ALL WHEEL DRIVE CONTINUOUSLY VARIABLE TRANSMISSION HAVING DUAL MODE OPERATION

BACKGROUND OF THE INVENTION

1. Field of the Invention

This invention relates to automatic transmissions for automotive vehicles. More particularly it pertains to such transmissions having a fixed ratio drive mechanism and a variable ratio drive mechanism.

2. Description of the Prior Art

A conventional multiple speed transmission has a number of spaced speed ratio changes produced by selectively holding and releasing components of a planetary gear set. An infinitely variable transmission that employs two variable diameter pulleys, and a drive belt engaging the pulleys provides a continuously variable speed ratio over a broad range of engine speeds.

A bladed hydrokinetic torque converter located in the drive path between an engine and the planetary gearing provides additional torque multiplication for accelerating a motor vehicle from rest. A stall torque ratio of about 2.5:1 may be realized using a torque converter.

A continuously variable transmission combining a fixed drive unit, variable drive unit, and torque converter is described in UK Patent application GB-2180020, assigned to the assignee of the present invention. After the torque converter reaches its coupling phase, when the ratio of the hydrokinetic unit is 1:1, the drive ratio for the powertrain is reduced to 8:1 from approximately 20:1 when the fixed drive ratio is 2:1 and the final drive and axle system ratio is 4:1. At that time the variable ratio drive is activated. Upon further acceleration of the vehicle, the overall transmission ratio may be controlled from 8:1 down to 2:1.

U.S. Pat. Nos. 4,856,369, 4,836,049 and 3,203,277 describe continually variable transmissions that employ a variable drive mechanism and a fixed drive mechanism in combination with a torque converter and planetary gearing.

SUMMARY OF THE INVENTION

It is an object of this invention to provide a transmission able to accelerate a motor vehicle from rest through a speed reduction drive that bypasses a belt driven variable ratio drive mechanism so that the relatively large starting torque is carried by robust mechanical components and not by torque limited components, such as a drive belt.

It is another object of this invention that the transmission produce a continuously variable speed ratio over a range from the first gear (starting gear) ratio to the highest ratio, an overdrive ratio.

It is yet another object of the invention to provide a transmission able to drive both front and rear wheels from two output shafts and without need for a transfer case to divide output torque carried on a single output shaft and to transmit torque to front and rear driveshafts.

According to the invention a continuously variable transmission for an automotive vehicle includes an input shaft; an intermediate shaft; an output shaft; a variable ratio drive mechanism having an input, an output driveably connected to said input and intermediate shaft, and an endless belt driveably engaged with the input and output for producing a continuously variable ratio of the input speed to the output speed; fixed ratio drive mechanism having an first element driveably connected to the output shaft drive and a second element driveably connected to the intermediate shaft; a first gearset having an input driveably connected to the input shaft and an output, for driving the output at a slower speed than the speed of the input; a second gearset having an input driveably connected to the output of the first gearset and an output driveably engaged with said input, for producing a slower speed and opposite direction of rotation of the output relative to the speed and direction of the input; a transfer clutch for alternately driveably connecting and disconnecting the input of the variable ratio drive mechanism and input shaft; an overrunning clutch producing a one-way drive connection of the output of the second gearset and the output shaft; and a low brake for alternately driveably holding fixed against rotation and releasing an element of the first gearset whereby the output of the first gearset is driven at a slower speed than the speed of the input shaft. Torque to the front axle is delivered by a second output shaft; and a clutch for alternately driveably connecting and disconnecting the intermediate shaft and second output shaft.

A reverse drive feature of the invention further includes a first reverse clutch for alternately driveably connecting and releasing the input shaft, output of the first gearset and the input of the second gearset; and a second reverse clutch for alternately driveably connecting and disconnecting the gear of the second gearset and the output shaft.

BRIEF DESCRIPTION OF THE DRAWINGS

FIG. 2 is a chart showing the engaged and disengaged state of clutches and brakes of the transmission of FIG. 1.

FIG. 3 shows a second embodiment of the reverse clutch shown in FIG. 1.

DESCRIPTION OF THE PREFERRED EMBODIMENT

Figure 1:
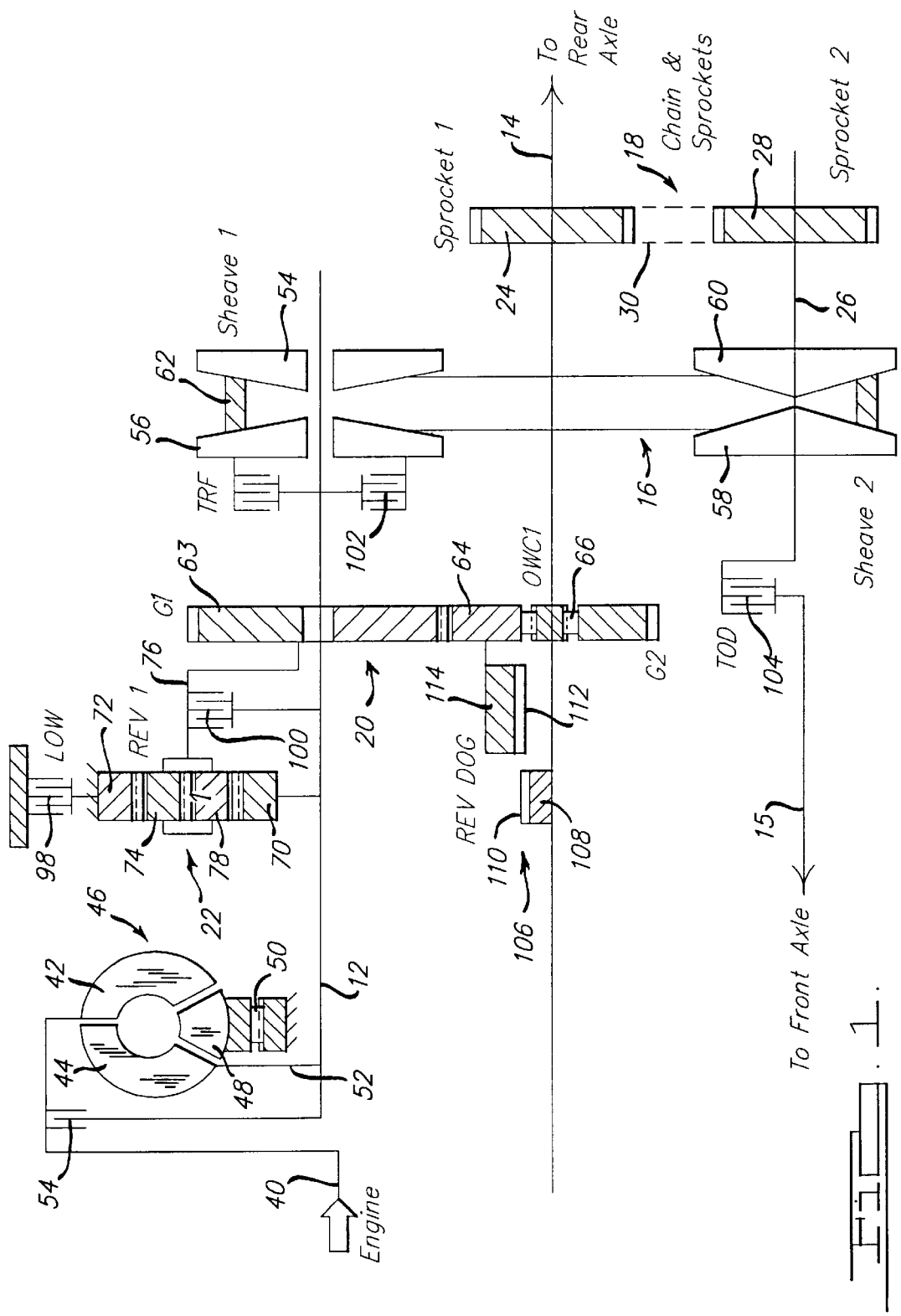
FIG. 1 is a schematic diagram of the kinematic arrangement for an automatic transmission according to the present invention.

Referring first to FIG. 1, a continuously variable transmission according to this invention includes an input shaft 12, rear output shaft 14, front output shaft 15, variable ratio drive mechanism 16, fixed ratio drive mechanism 18, layshaft gearing 20, planetary gearset 22, and various clutches and brakes for controlling the mechanical elements of the transmission.

Fixed ratio drive mechanism 18 driveably connects output shaft 14, which rotatably supports a first sprocket wheel 24, and intermediate shaft 26, which supports a second sprocket wheel 28, sprockets 24, 28 being mutually driveably engaged through a chain 30. Alternatively, shaft 26 can be driveably connected to shaft 14 through another fixed ratio gear mechanism, such as a simple layshaft arrangement including gears in place of sprockets 24, 28 and an idler gear meshing with those gears so that shaft 26 turns in the same direction as shaft 14. The first sprocket 24 is fixed to and rotatably supported on shaft 14; the second sprocket 28 is fixed to and rotatably supported on intermediate shaft 26.

The engine crankshaft 40 is driveably connected to a hydrokinetic torque converter 46 that includes a bladed impeller wheel 42 arranged in a toroidal fluid flow path with a bladed turbine wheel 44, arranged to be driven hydrodynamically by fluid exiting the impeller wheel. A bladed stator wheel 48 is located in the flow path between fluid entrance to the impeller and the fluid exit of the turbine. A one-way clutch 50 rotatably supports the stator wheel in one direction about the axis of shaft 12. In a conventional way the torus of the torque converter is filled with hydraulic fluid and the turbine wheel 44, is supported rotatably on a turbine hub 52, which is connected driveably to input shaft 12. A hydraulically operated bypass clutch 54 alternately mechanically connects engine shaft 40 to input shaft 12 when clutch 54 is engaged, and allows shaft 40 to drive the impeller hydraulically when clutch 54 is disengaged. The torque converter produces torque amplification and speed reduction until it reaches coupling speed.

Input shaft 12 is connected, preferably through torque converter 46, to a source of power, such as an internal combustion engine or electric motor. Rear output shaft 14 is driveably connected to the drive wheels of a motor vehicle, preferably to the rear wheels. Front output shaft 15 is driveably connected to the drive wheels of a motor vehicle, preferably to the front wheels. Alternatively, output shaft 14 can be connected to the front axles, and output shaft 15 can be connected to the rear axles.

Variable ratio drive mechanism 16 includes a first sheave assembly, which includes pulleys 54, 56 supported rotatably on input shaft 12, and a second sheave assembly, which includes pulleys 58, 60 supported rotatably on intermediate shaft 26. The axial position of one of the first pair of pulleys 54, 56 is fixed on the input shaft, the other pulley of the pair is moveable axially along the shaft, preferably in response the hydraulic pressure applied to an actuating device, so that the radial position of the drive belt 62 moves in accordance with the axial position of the axially displaceable pulley due to the inclined surfaces of the pulley faces that engage driveably the lateral surfaces of the drive belt 62. Similarly, one of the pulleys 58, 60 on shaft 26 is fixed in its axial position, and the other pulley is axially displaceable so that the inclined inner faces of the pulleys are continually engaged at a variable radial position with lateral surfaces of drive pulley 62. Movement of the displaceable pulleys is mutually coordinated so that they maintain driving contact with the belt. In this way the speed ratio produced by mechanism 16 is continuously variable.

The layshaft gearset 20 includes a pinion 63 coaxial with input shaft 12; and a gear 64, supported by a overrunning clutch 66 on shaft 14. Overrunning clutch 66 provides a one-way drive connection between gear 64 and shaft 14. Alternatively gear 64 may be rotatably fixed to shaft 14 without use of clutch 66.

The planetary gearing 22 includes a sun gear 70 driveably fixed to input shaft 12, ring gear 72 coaxial with the sun gear, a first set of planet pinions 74 meshing with the ring gear and rotatably supported on a carrier 76, a second set of planet pinions 78 meshing with the sun gear and planet pinions 74 and rotatably supported on carrier 76, which is driveably connected to pinion 63.

The elements of the transmission according to this invention are controlled operatively by various clutches and brakes, preferably hydraulically actuated friction devices, including low brake 98, first and second reverse clutches 100, 101, transfer clutch TRF 102, and torque on demand (TOD) clutch 104, or a reverse dog clutch 106, an alternative to reverse clutch 101. These friction elements may be hydraulically, mechanically or electrically operated. Low brake 98 alternately driveably holds against rotation and releases ring gear 72 to rotate; first reverse clutch 100 alternately mutually driveably connects and releases shaft 12, pinion 63 and carrier 76; transfer clutch TRF 102 alternately driveably connects and releases pulleys 54, 56 and shaft 12; second reverse clutch 101 alternately driveably connects and releases gear 64 and shaft 14; and torque on demand (TOD) clutch 104 alternately driveably connects and releases shafts 26 and 15. An alternative to the hydraulically actuated reverse clutch 101, shown in FIG. 3, is the dog clutch 106 of FIG. 1 having a coupler 108 displaceable along the axis of shaft 14 and carrying radial dog teeth 110 adapted to driveably engage axially directed recesses 112 extending radially from the inner surface of member 114, which is fixed to gear 64.

First gear is produced by engaging low brake 98 and releasing all the other friction elements, except that clutch 104 is activated when drive to both front and rear axles is desired, as discussed below. This action causes OWC 66 to driveably connect shaft 14 and gear 64, and grounds ring gear 72. Sun gear 70 is driven by the engine; therefore carrier 76 revolves about the sun gear 70 slower than, and in the opposite direction from the speed and direction of the engine. The layshaft gearing 20 multiplies torque to shaft 14 and reverses its direction of rotation back to the direction of the engine and shaft 12. Therefore, the rear wheels are driven by shaft 14 at a reduced speed in relation to that of shaft 12 through operation of pinion 63 and gear 64, and in the same direction as that of shaft 12. Gear 64 is connected to sprocket 24 through OWC 66 and shaft 14. If the front axle is to be driven also, intermediate shaft 26 is driven through fixed ratio mechanism 18 in the same direction as that of the engine. TOD clutch 104 is engaged to directly connect front output shaft 15 to the power source, or that clutch is modulated to control the magnitude of torque transmitted to shaft 15.

An upshift to the low speed end of the continuously variable range is accomplished by engaging transfer clutch 102, and disengaging the other friction elements. These actions cause one-way clutch 50 to overrun. After the upshift is completed, low brake 98 can be disengaged to prevent clutch 100 from counter-rotating.

In the CVT mode, TRF clutch 102 connects input shaft 12 to a first sheave, whose pulleys 54, 56 drive the pulleys 58, 60 of a second sheave through belt 62 at a variable speed ratio that depends on the radial positions at which belt 62 engages the sheaves. Shaft 26 drives sprocket 28, which drives the rear output shaft 14 and the rear wheels due to engagement of chain 30 with sprockets 28, 24. The TOD clutch 104 can be used to driveably connect the pulleys 58,60 of the second sheave to the front output shaft 15.

Preferably the speed ratio produced in first or low gear through operation of gear unit 22 is spaced slightly from the speed ratio at the lowest end of the continually variable range produced through operation of the variable ratio drive 16. In this way the transition from first gear to the lowest variable gear ratio is an upshift.

Preferably the gear ratio produced in low gear is 3.061; the gear ratio at the low speed end of the continually variable range is 2.018; the gear ratio at the mid-range of the CV range, where the speed of the two sheave assemblies is substantially equal is 1.0; the gear ratio at the high speed end of the CV range is 0.525; and the gear ratio in reverse drive is −2.778. Pinion 63 has 27 teeth; gear 64 has 75 teeth; sprocket 24 has 114 teeth; and sprocket 28 has 131 teeth. Sun gear has 49 teeth, ring gear 72 has 103 teeth, and pinions 74, 78 each have 27 teeth.

Reverse drive is produced by engaging reverse clutch 100, disengaging reverse clutch 101 or dog clutch 106, and disengaging the other friction elements, except that TOD clutch 104 may be engaged to drive the front wheels when desired, as explained below. Clutch 100 couples shaft 12 and pinion 63. The layshaft gearing 20 drives shaft 14 in the opposite direction from that of the engine and multiplies input shaft torque. Either clutch 101 or dog clutch 106 connects gear 64 to shaft 14 and sprocket 24. These actions cause OWC 66 to overrun. Shaft 14 drives the rear wheels, and sprocket 24 drives the front wheels through the fixed ratio mechanism 18, intermediate shaft 26, TOD clutch 104, and front output shaft 15.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

We claim:

1. An automatic continuously variable transmission, comprising:
   an input shaft;
   an intermediate shaft;
   an output shaft;
   a variable ratio drive mechanism having an input, an output driveably connected to said input and intermediate shaft, and an endless belt driveably engaged with the input and output for producing a continuously variable ratio of the input speed to the output speed;
   fixed ratio drive mechanism having an first element driveably connected to the output shaft drive and a second element driveably connected to the intermediate shaft;
   a first gearset having an input driveably connected to the input shaft and an output, for driving the output at a slower speed than the speed of the input;
   a second gearset having an input driveably connected to the output of the first gearset and an output driveably engaged with said input, for producing a slower speed and opposite direction of rotation of the output relative to the speed and direction of the input;
   a transfer clutch for alternately driveably connecting and disconnecting the input of the variable ratio drive mechanism and input shaft; and
   an overrunning clutch producing a one-way drive connection of the output of the second gearset and the output shaft; and
   a low brake for alternately driveably holding fixed against rotation and releasing an element of the first gearset whereby the output of the first gearset is driven at a slower speed than the speed of the input shaft.

2. The transmission of claim 1 further comprising:
   a second output shaft; and
   a clutch for alternately driveably connecting and disconnecting the intermediate shaft and second output shaft.

3. The transmission of claim 1 further comprising:
   a first reverse clutch for alternately driveably connecting and releasing the input shaft, output of the first gearset and the input of the second gearset; and
   a second reverse clutch for alternately driveably connecting and disconnecting the gear of the second gearset and the output shaft.

4. The transmission of claim 1 further comprising:
   a torque converter having an impeller adapted for a driveable connection to a power source, a turbine adapted for a hydrokinetic drive connection to the impeller and driveably connected to the input shaft.

5. The transmission of claim 1, wherein
   the fixed ratio drive mechanism includes a first sprocket driveably fixed to the output shaft, a second sprocket driveably fixed to the intermediate shaft, and a flexible continuous element driveably engaging the first and second sprockets; and
   the variable ratio drive includes a first sheave, a second sheave driveably fixed to the intermediate shaft, and a flexible continuous element driveably engaging the first and second sheaves at steplessly variable radial positions.

6. A continuously variable transmission comprising:
   an input shaft;
   an intermediate shaft;
   an output shaft;
   a variable ratio drive mechanism having an input, an output driveably connected to said input and intermediate shaft, and an endless belt driveably engaged with the input and output for producing a continuously variable ratio of the input speed to the output speed;
   fixed ratio drive mechanism having an first element driveably connected to the output shaft drive and a second element driveably connected to the intermediate shaft;
   the first gearset having a sun gear driveably connected to the input shaft, a ring gear surrounding the sun gear, a carrier, a first set of planet pinions rotatably supported on the carrier and driveably engaged with the ring gear, a second set of pinions rotatably supported on the carrier and driveably engaged with sun gear and first set of pinions;
   the second gearset having a pinion driveably connected to the carrier, a gear meshing with the pinion; a first gearset driveably connected to the input shaft and output shaft, for driving the output shaft at a slower speed than the speed of the input shaft;
   a transfer clutch for alternately driveably connecting and disconnecting the input of the variable ratio drive mechanism and input shaft; and
   an overrunning clutch producing a one-way drive connection of the gear of the second gearset and the output shaft; and
   a low brake for alternately driveably holding fixed against rotation and releasing the ring gear and input shaft.

7. The transmission of claim 6 further comprising:
   a second output shaft; and
   a clutch for alternately driveably connecting and disconnecting the intermediate shaft and second output shaft.

8. The transmission of claim 6 further comprising:
   a first reverse clutch for alternately driveably connecting and releasing the input shaft, output of the first gearset and the input of the second gearset; and
   a second reverse clutch for alternately driveably connecting and disconnecting the gear of the second gearset and the output shaft.

9. The transmission of claim 6 further comprising:
   a torque converter having an impeller adapted for a driveable connection to a power source, a turbine adapted for a hydrokinetic drive connection to the impeller and driveably connected to the input shaft.

10. The transmission of claim 6, wherein
    the fixed ratio drive mechanism includes a first sprocket driveably fixed to the output shaft, a second sprocket driveably fixed to the intermediate shaft, and a flexible continuous element driveably engaging the first and second sprockets; and
    the variable ratio drive includes a first sheave, a second sheave driveably fixed to the intermediate shaft, and a flexible continuous element driveably engaging the first and second sheaves at steplessly variable radial positions.

11. A continuously variable transmission comprising:

an input shaft;

an intermediate shaft;

an output shaft;

a second output shaft;

a variable ratio drive mechanism having an input, an output driveably connected to said input and intermediate shaft, and an endless belt driveably engaged with the input and output for producing a continuously variable ratio of the input speed to the output speed;

a fixed ratio drive mechanism having an first element driveably connected to the output shaft drive and a second element driveably connected to the intermediate shaft;

a first gearset having an input driveably connected to the input shaft and an output, for driving the output at a slower speed than the speed of the input;

a second gearset having an input driveably connected to the output of the first gearset and an output driveably engaged with said input, for producing a slower speed and opposite direction of rotation of the output relative to the speed and direction of the input;

a transfer clutch for alternately driveably connecting and disconnecting the input of the variable ratio drive mechanism and input shaft; and an overrunning clutch producing a one-way drive connection of the output of the second gearset and the output shaft;

a low brake for alternately driveably holding fixed against rotation and releasing an element of the first gearset whereby the output of the first gearset is driven at a slower speed than the speed of the input shaft;

a clutch for alternately driveably connecting and disconnecting the intermediate shaft and second output shaft;

a first reverse clutch for alternately driveably connecting and releasing the input shaft, output of the first gearset and the input of the second gearset; and a second reverse clutch for alternately driveably connecting and disconnecting the gear of the second gearset and the output shaft.

12. The transmission of claim 9 wherein:

the overrunning clutch produces a one-way drive connection of the gear of the second gearset and the output shaft;

the low brake alternately driveably holds fixed against rotation and releasing the ring gear;

the first gearset includes a sun gear driveably connected to the input shaft, a ring gear surrounding the sun gear, a carrier, a first set of planet pinions rotatably supported on the carrier and driveably engaged with the ring gear, a second set of pinions rotatably supported on the carrier and driveably engaged with sun gear and first set of pinions; and the second gearset includes a pinion driveably connected to the carrier, a gear meshing with the pinion; a first gearset driveably connected to the input shaft and output shaft, for driving the output shaft at a slower speed than the speed of the input shaft.

* * * * *